United States Patent [19]
Haines

[11] 4,364,990
[45] Dec. 21, 1982

[54] CONSTRUCTION MATERIAL FOR STRINGED MUSICAL INSTRUMENTS

[75] Inventor: Daniel W. Haines, Columbia, S.C.

[73] Assignee: The University of South Carolina, Columbia, S.C.

[21] Appl. No.: 563,387

[22] Filed: Mar. 31, 1975

[51] Int. Cl.³ .............................................. B32B 7/02
[52] U.S. Cl. ..................................... 428/218; 84/184;
84/193; 428/283; 428/284; 428/286; 428/325;
428/406; 428/407; 428/408; 428/413; 428/415;
428/427; 428/438; 428/902; 428/910
[58] Field of Search ............... 428/218, 413, 416, 438,
428/427, 366, 367, 368, 902, 406, 408, 407, 910;
84/184, 187, 192, 193, 452 R, 452 P

[56] References Cited

U.S. PATENT DOCUMENTS

| | | | |
|---|---|---|---|
| 3,316,139 | 4/1967 | Alford et al. | 428/227 |
| 3,474,697 | 10/1969 | Kaman | 84/452 P UX |
| 3,477,330 | 11/1969 | Bert | 84/193 |
| 3,617,416 | 11/1971 | Komrey | 156/173 |
| 3,618,442 | 11/1971 | Kawakami | 84/193 UX |
| 3,664,911 | 5/1972 | Takabayashi | 84/193 UX |
| 3,699,836 | 10/1972 | Glasser | 84/452 P X |
| 3,724,312 | 4/1973 | Yamada et al. | 84/193 |

*Primary Examiner*—James J. Bell
*Attorney, Agent, or Firm*—Roylance, Abrams, Berdo & Farley

[57] ABSTRACT

Improved construction material especially suitable for use in the manufacture of soundboards and panels used in stringed instruments which equal or surpass the sound radiation qualities and physical properties of wood. The construction material of the invention includes fibers having a Young's modulus of elasticity greater than $18 \times 10^{11}$ dynes/cm² and a density less than 2 g/cc bonded to a material having a density lying within the range of 0.15 g/cc and 1 g/cc, the said fibers of the composite are oriented in such manner so as to provide a final material having a bending stiffness ratio of at least 4:1.

12 Claims, 14 Drawing Figures

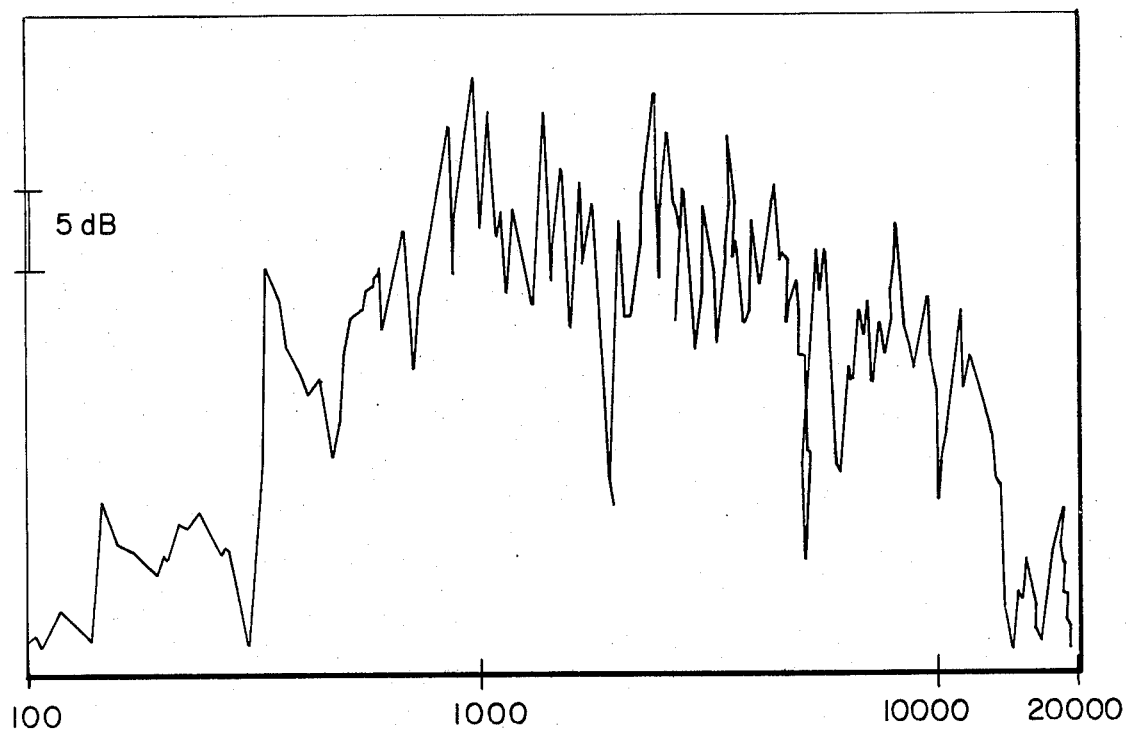
FIG.4   FREQUENCY (HERTZ)
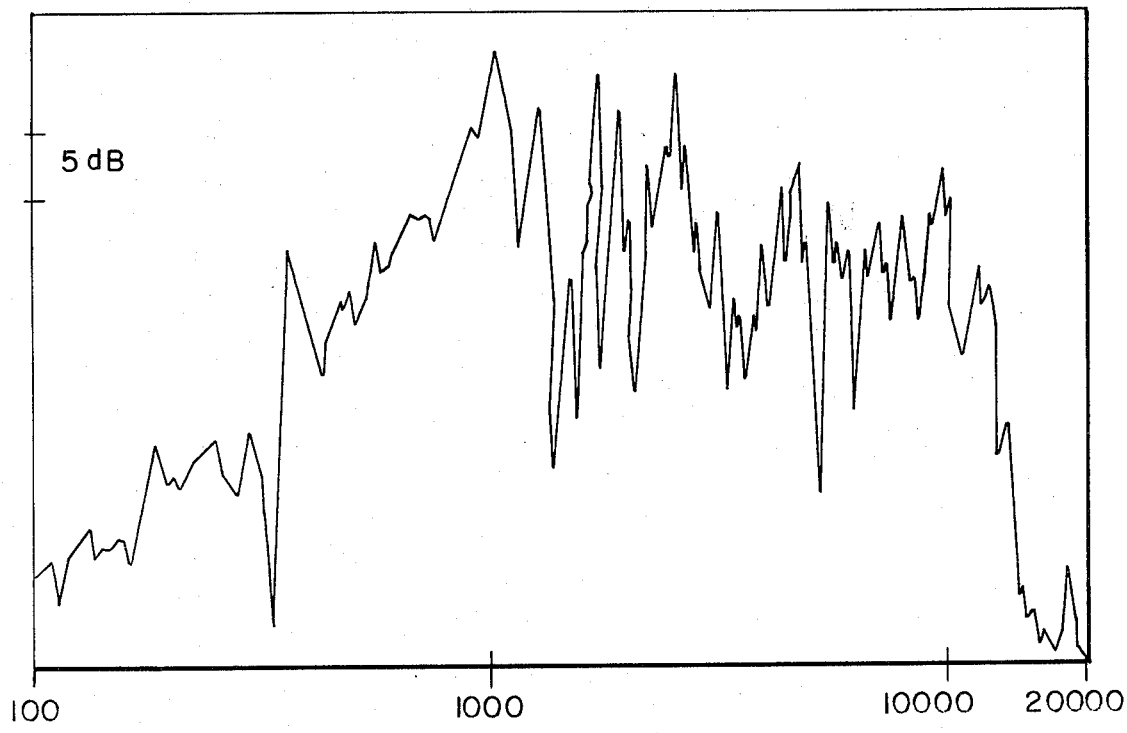
FIG.5   FREQUENCY (HERTZ)

334 Hz

140 Hz

327 Hz

142 Hz

FREQUENCY IN CYCLES PER SECOND

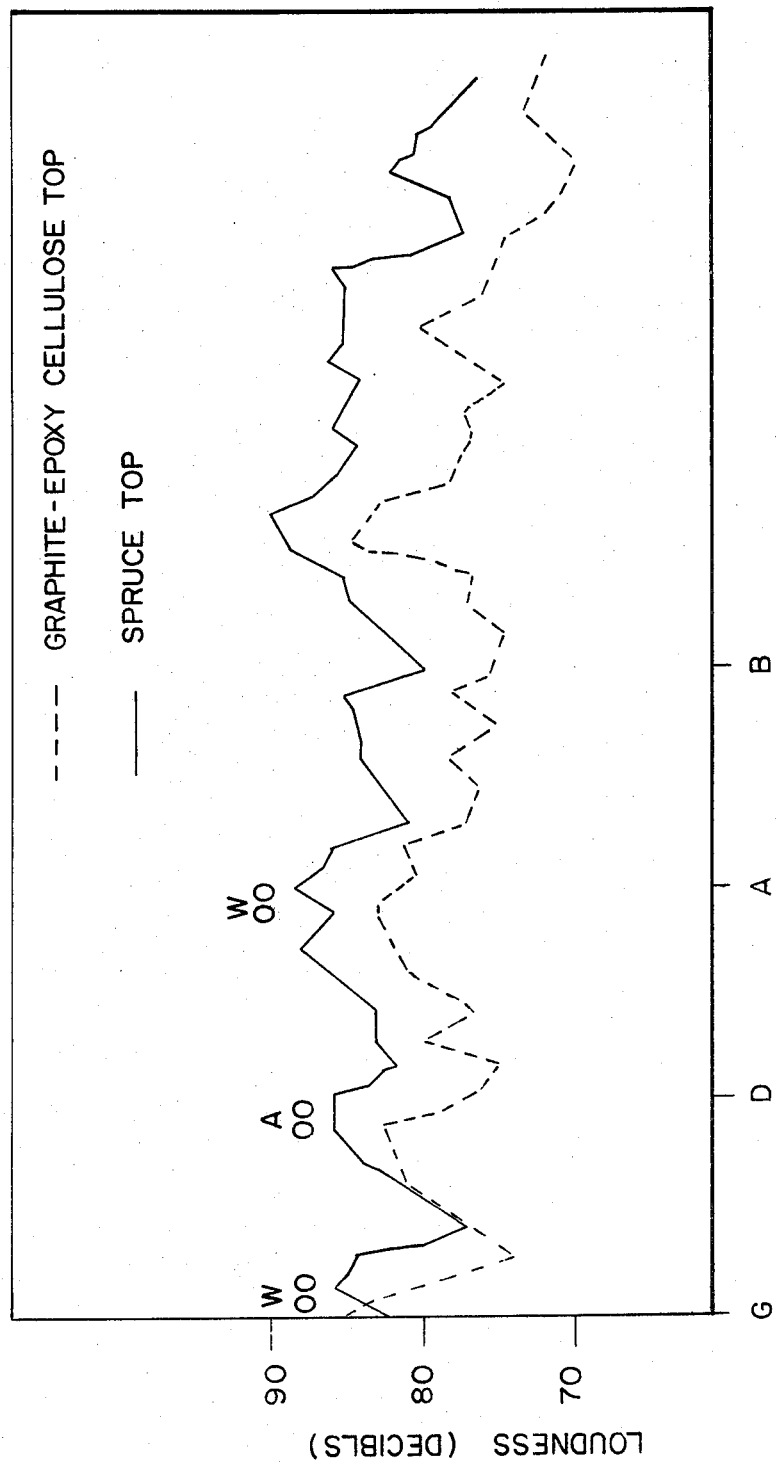

CONSTRUCTION MATERIAL FOR STRINGED MUSICAL INSTRUMENTS

BACKGROUND OF THE INVENTION

Stringed musical instruments, such as guitars, violins, cellos, pianos and harpsichords are constructed almost entirely of wood. Wood construction has been necessary for the well established reason that the resonance and impedance qualities of wood are the critical factors in the quality of sound which radiates from the instrument. Heretofore, various wood substitutes have been advanced or suggested for all or part of the wood normally used in stringed instruments. For the most part, however, all such substitutes have resulted in instruments suffering one or more defects such as misplaced resonance frequencies and overall weak response.

Unfortunately, a large number of the instruments of wood manufactured today are of inferior quality which can be attributed in good part to the lack of skilled craftsmen. To compensate the variations in wood properties to properly and individually place the resonance frequencies necessary to produce consistently fine instruments requires skills possessed by very few persons. Moreover, the mechanical and physical properties of wood are greatly affected by climatic conditions, especially humidity. Some wood instruments undergo drastic changes in quality with even the slightest variation in environmental conditions. Cracking, to name one major disadvantage, is common with instruments made of wood.

Not the least in importance is the fact that the worldwide supply and accessability of suitable wood for any purpose is dwindling. Heretofore, a relatively inexpensive durable wood substitute, stable with changes in environmental conditions and having predictable properties suitable for the construction of musical instruments possessing a musical quality as good as or better than instruments made of wood has not been known in the art.

In stringed instruments, the entire body, including the top and back plates or case, the ribs, the enclosed air, and all of the attachments, form a highly complex vibrating system. Numerous materials have been suggested and advanced as substitutes for wood in the manufacture of top and back plates or sounding boards. Among the substitutes known in the art are glass epoxy-balsa sandwiches, aluminum-aluminum honeycomb sandwiches, solid glass foam and beryllium, to name a few. While experimentation with the foregoing materials has represented scientific advancement, none of the wood substitute materials heretofore suggested, or used, have successfully duplicated or exceeded the qualities of wood in the construction of stringed instruments.

It is also well known that the overall shape and material constituents of stringed instruments are properties which cannot be treated independently. If, for example, isotropic materials such as metals, ceramics, and plastics were used and an attempt made to duplicate the sound radiating qualities of wood, the instruments would be of such bizarre shapes as to be unplayable.

IN THE DRAWINGS

FIG. 4 is a plot of the frequency response of unvarnished precisely tuned spruce violin top plate.

FIG. 5 is a plot of the frequency response of the graphite fiber epoxy-cardboard violin top plate of the invention.

FIG. 14 is a graph showing a plot comparing the loudness of a wood violin and a violin having a top plate of the inventive material.

SUMMARY OF THE INVENTION

Figure 1:
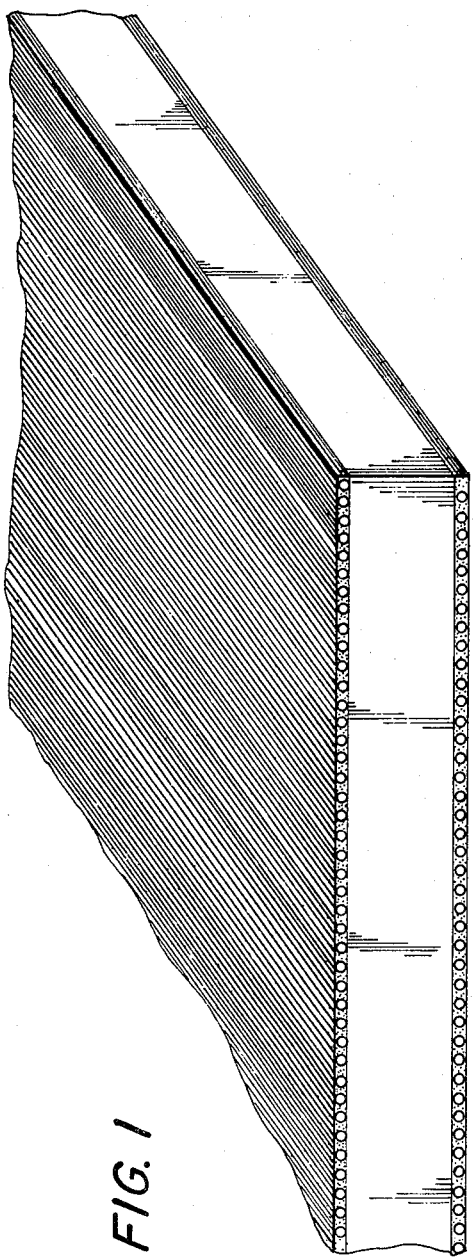
FIG. 1 is an isometric view of the composite construction of a preferred embodiment of the construction material of the invention.

This invention relates to the discovery of a new construction material which successfully simulates the flexural vibration of wood, offers advantages and qualities superior to wood and may be used successfully for construction of stringed instruments. In accordance with the invention a construction material is provided that closely duplicates or exceeds the acoustical properties of wood without the attendant physical disadvantages of wood. The inventive material comprises a mat of fibers in which said fibers have a modulus of elasticity greater than $18 \times 10^{11}$ dynes/cm$^2$ and a density less than 2 g/cc and oriented in such manner as to effect a bending stiffness ratio of at least 4:1 in the finished material bonded to a mat of material having a density within the range of 0.15 g/cc and 1 g/cc. In another embodiment the mat of material having a density within the range of 0.15 g/cc and 1 g/cc is sandwiched between mats of the fiber. Specific embodiments of the invention contemplate fibers of graphite and boron bonded to a mat of a material having the density within the range of 0.15 g/cc and 1 g/cc.

In an embodiment of the invention, the fibers are oriented unidirectionally, embedded in an epoxy resin and bonded to a mat of cellulosic material through the epoxy resin. An extremely satisfactory, relatively inexpensive cellulosic material meeting the requirements of the invention is cardboard. In the preferred embodiment of the invention, a core of cardboard is sandwiched between mats of unidirectionally oriented graphite fibers embedded in epoxy resin.

The construction material of the invention provides orthotropic flat plates of constant thickness which satisfy the low frequency, long wave flexural equation of motion as follows:

$$D_x \frac{\partial^4 w}{\partial x^4} + 2H \frac{\partial^4 w}{\partial x^2 \partial y^2} + D_y \frac{\partial^4 w}{\partial y^4} - q = \gamma \frac{\partial^2 w}{\partial t^2}$$

where x and y are cartesian coordinates in the mid-plane of the plate, w is the displacement normal to the plate, q and $\gamma$ are the applied normal load and mass per unit surface area (areal density), $D_x$ and $D_y$ are the bending stiffnesses in the x and y directions, and 2H is the warping stiffness.

In order for any wood substitute to provide the tonal qualities and minimum physical properties of wood for use in the manufacture of quality stringed instruments, the substitute material would have to satisfy the foregoing equation within the limitation of the criteria of the specific wood to be duplicated. The wood plates and sounding boards of such stringed instruments are orthotropic by virtue of being invariably quarter sawn, i.e. cut along a radial plane from the tree. The range for which the equation is valid covers most of the frequencies of acoustical importance. The wave lengths at these frequencies are of such length that the non-homogeneity due to the grain structure of wood may be ignored. In plates for which the $D_x/D_y$ ratio is as high as is in the case of wood plates used in stringed instruments, the warping stiffness (2H) is of second order importance and the effect of damping can be determined by measuring the width of resonance peaks at specific amplitude ratios.

Figure 3:
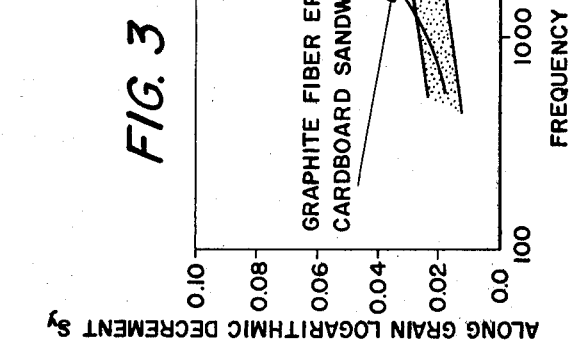
FIG. 3 is a graph comparing the along-the-grain logarithmic decrement with frequency for flexural vibration of spruce and the graphite fiber epoxy-cardboard composite of the invention.
Figure 2:
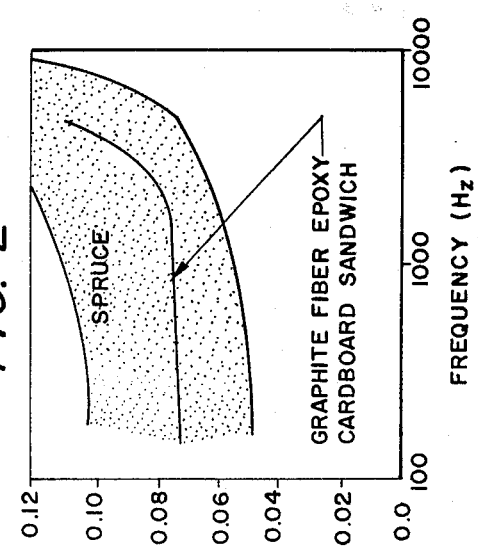
FIG. 2 is a graph comparing the cross-grain logarithmic decrement with frequency for flexural vibration of spruce and the graphite fiber epoxy cardboard composite of the invention.

Referring specifically to FIG. 2, the shaded area comprises the "cross grain" logarithmic decrement of various species and qualities of spruce with and without finishing materials. It may be seen that the graphite fiber epoxy-cardboard embodiment of the invention falls squarely within the ranges of utilizable spruce. Referring specifically to FIG. 3 it will be appreciated that the "along grain" qualities of spruce and the graphite fiber epoxy-cardboard embodiment of the invention are substantially identical in the frequency range up to about 200 $H_z$ while the inventive material exhibits the superior feature more damping at the frequencies above 2000 $H_z$. If a finish, e.g. filler, varnish or lacquer is used on the wood, this factor must be taken into consideration in defining its tonal properties.

While maple, mahogany, rosewood and cedar are commonly used in construction of plates and sounding boards in stringed instruments, spruce is the most frequency used wood. It is the overwhelming choice for the top plates of guitars and instruments of the violin family and soundboards for pianos and harpsichords. Of all woods, spruce also offers the greatest challenge to duplication of properties for the reason that its "along the grain—stiffness to weight ratio" is exceptionally high.

Accordingly, in the discussion hereinafter the qualities of spruce have been used as the standard to be at least duplicated or exceeded by the material of the invention. It is to be understood that the qualities of other woods may also be readily duplicated by calculating the respective properties of the chosen wood.

Utilizing the equation and neglecting the warping stiffness and considering damping, the values for a 2.5 mm thick spruce plate to be matched or exceeded for substitute are as follows:

1. $D_x/D_y$: Ratio of along the grain to cross grain bending stiffnesses, at least 9.
2. $D_x/\gamma$: Ratio of along the grain bending stiffness to areal density, at least $10 \times 10^6$ m/sec$^2$.
3. $\gamma$: Areal density, between 0.75 and 1.4 kg/m$^2$.
4. $\delta_x$ and $\delta_y$: Logarithmic decrement, a measure of damping of flexural vibrations along the grain ($\delta_x$) and cross grain ($\delta_y$). These quantities are not constants but generally rise with frequency.

Although these criteria were developed from consideration of flat plates, they are valid as well for plates with some curvature, for example, arched violin plates, where deformation is still basically flexural.

It was discovered that fiber-reinforced composite materials offered definite obvious advantages to a material designed to reproduce the values of the "along the grain—to cross the grain stiffness" ($D_x/D_y$) of wood, that is, at least a 4:1 ratio. It was also discovered that graphite and boron fibers had sufficiently high fiber stiffness, i.e. $18 \times 10^{11}$ dynes/cm$^2$ and above, to reach the values of $D_x/D_y$ exhibited by spruce. Glass fibers, for example, fall far short of the requirement.

Utilizing a sufficiently thick graphite fiber epoxy plate, "criterion" 2 ($D_x/\gamma$) could be achieved, but the resulting material is so heavy that "criterion" 3 ($\gamma$) would be unapproachable. While such material exhibits "correct" resonance frequencies, its impedance would be far too high, resulting in low amplitude vibrations and a weak sound from the instrument. Accordingly, a graphite fiber epoxy material alone was found to be unsatisfactory as a substitute for wood.

It was unexpectedly discovered that all of the criteria could be satisfied if the fiber containing mat was bonded to a material having a density within the range of 0.15 g/cc and 1 g/cc. Materials found satisfactory within the desired range for the core material are various thicknesses of paper and cardboard.

In accordance with the process of the invention, the construction material is prepared by simultaneously curing and bonding the mat of fibers embedded in an uncured or partially cured resin sheet to the core material. In the preferred embodiment of the invention, the laminate is bonded without using additional adhesives which add an unwanted weight whereby the requirements of Criterion 3 ($\gamma$) are more difficult to satisfy. To prepare flat plates of the material a simple press with heated plattens is quite satisfactory. For instruments which require a fairly high arch as in violins, a rigid mold is used and the material cured and molded by pressing the composite to the mold within a vacuum bag and elevating the temperature to the desired heat and pressure inside an autoclave.

The following examples illustrate the preparation of the specific embodiments of the invention.

EXAMPLE 1

Cardboard a material having a modulus of elasticity which is essentially the same in the longitudinal and transverse directions, 0.15 cm thick having a density of 0.537 g/cc was sandwiched between a prepreg (partially cured) facing material comprising extremely fine, high stiffness graphite fibers oriented in substantially one direction and embedded in an epoxy resin to form sheets 0.015 cm thick. The sandwich was treated with heat and pressure as follows: 18 minutes at 275° F. at 15 psi followed by 30 minutes treatment at 300° F. at 100 psi, with subsequent elevation of the temperature to 350° F. while maintaining the pressure at 100 psi. The composite was then cooled to room temperature while maintaining the material under pressure. The areal density of this material was determined to be 0.12 g/cm².

Flat strips of the material having a composite thickness of 0.13 cm were cut. By means of electromagnetic excitation, the free strips were vibrated at their fundamental modes at flexural vibration and the bending stiffness ratio was determined to be 16 to 1.

Using the material prepared in accordance with Example 1, top plates for a violin and a guitar were manufactured and compared with high quality top plates of wood. The frequency response was determined both for the unvarnished precisely tuned spruce top plate and the top plate manufactured from the material of Example 1 by using an electromagnetic transducer. The frequency response curves obtained for each plate are illustrated in FIGS. 4 and 5 respectively. It will be observed that the responses of the highly tuned wood and the material of the invention are substantially identical.

Figure 8:
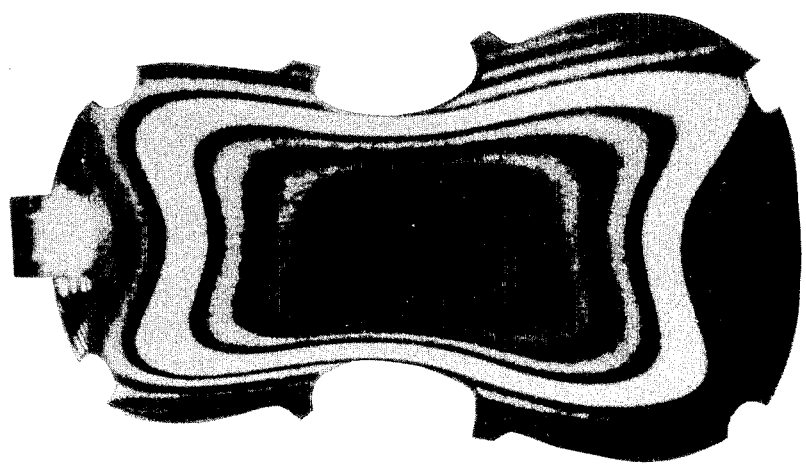
FIG. 8 is a photograph reproduction showing a spruce violin top plate vibrating in the ring mode (mode number 5).
Figure 6:
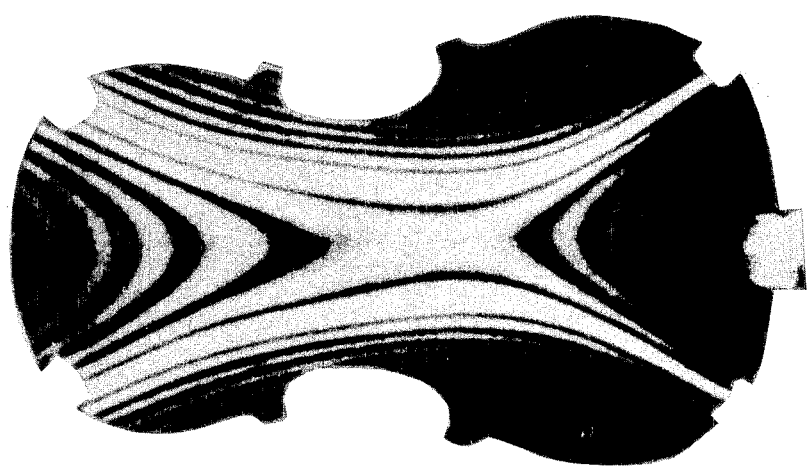
FIG. 6 is a photograph reproduction showing a spruce violin top plate vibrating in mode number 2.
Figure 9:
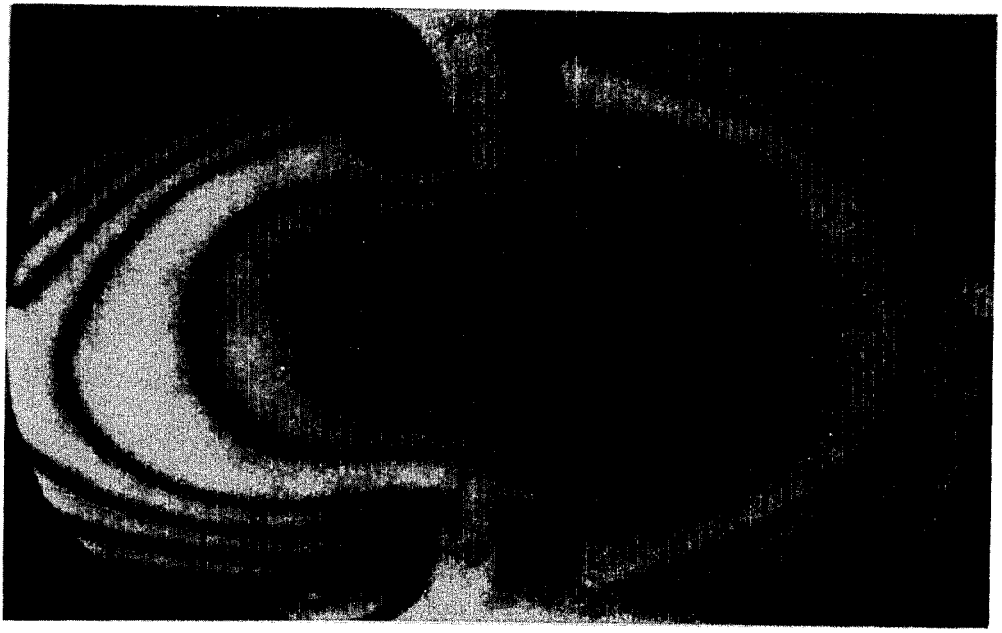
FIG. 9 is a photograph reproduction showing a graphite fiber epoxy-cardboard violin top plate of the invention vibrating in ring mode (mode number 5).
Figure 7:
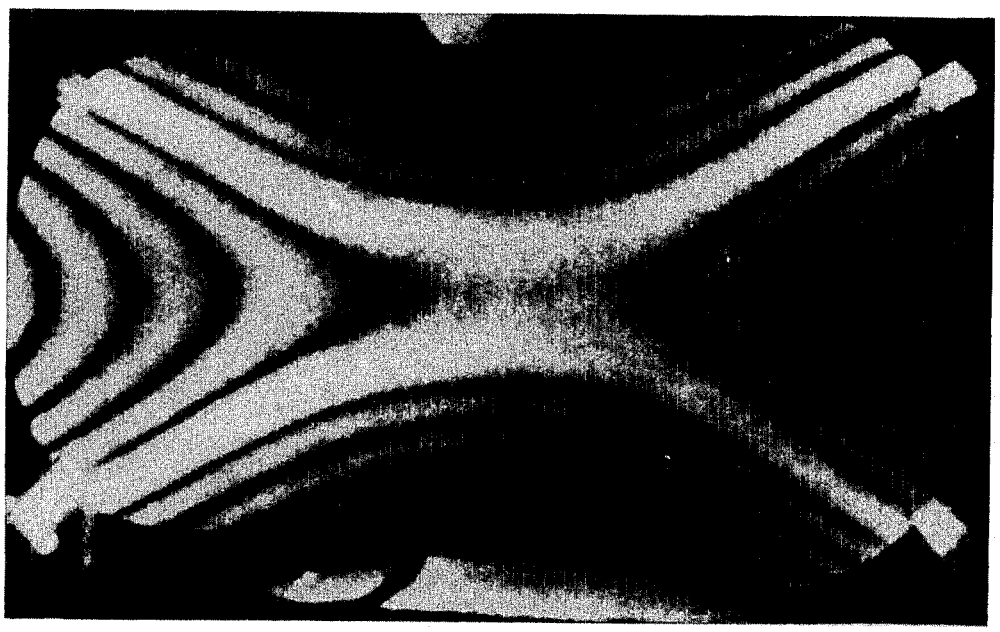
FIG. 7 is a photograph reproduction showing a graphite fiber epoxy-cardboard violin top plate of the invention vibrating in mode number 2.

In the photographic reproductions of FIGS. 6 and 8 are shown holographic interferograms of Modes 2 and 5 of a wood violin top plate. Likewise, FIGS. 7 and 9 show the holographic interferograms for Modes 2 and 5 of a violin top plate manufactured from the material prepared in accordance with Example 1. It may be appreciated from a comparison of the respective photographs that Mode 2 has a characteristic "X" pattern and Mode 5 has the characteristic "closed ring" pattern for both materials, and the patterns for each are substantially identical at substantially identical frequencies.

Figure 10:
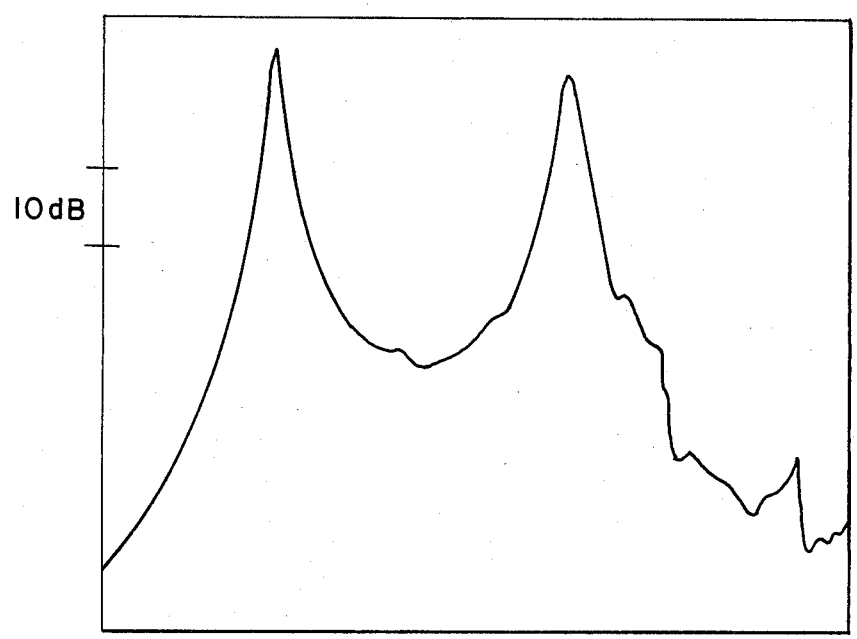
FIG. 10 is a logarithmic plot of the frequency response of an all wood guitar electromechanically excited.
Figure 11:
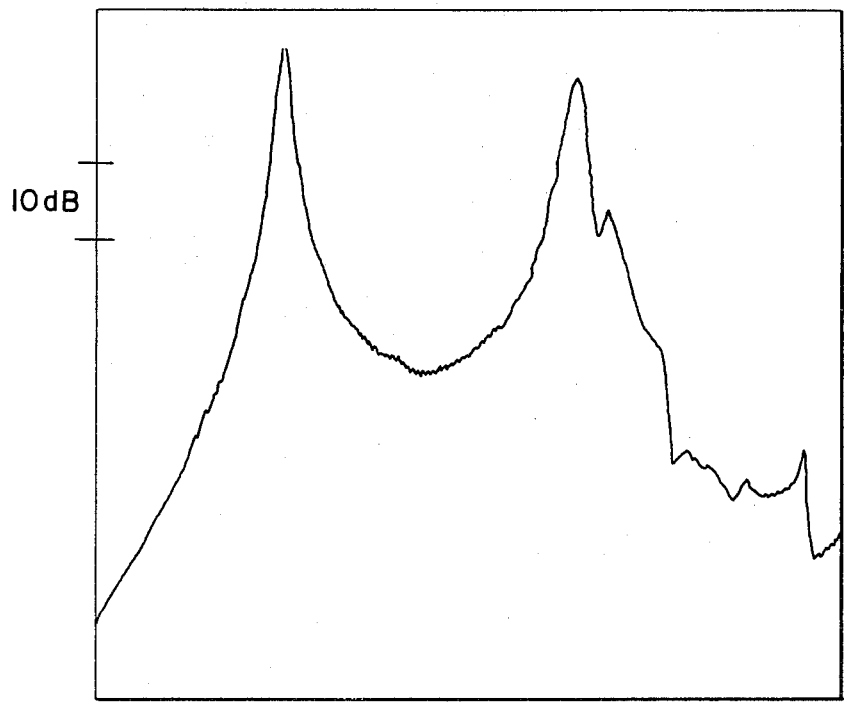
FIG. 11 is a logarithmic plot of the frequency response of a guitar having a graphite fiber epoxy-cardboard top plate of the invention electromechanically excited.

Guitars prepared having tops respectively of wood and the material of the invention prepared in accordance with Example 1 were tested for comparison of frequency response using an electromagnetic transducer attached to the bridge of each instrument. FIGS. 10 and 11 are the respective plots of frequency for the two instruments. It may be seen that the responses of the instruments were substantially identical.

Figure 12:
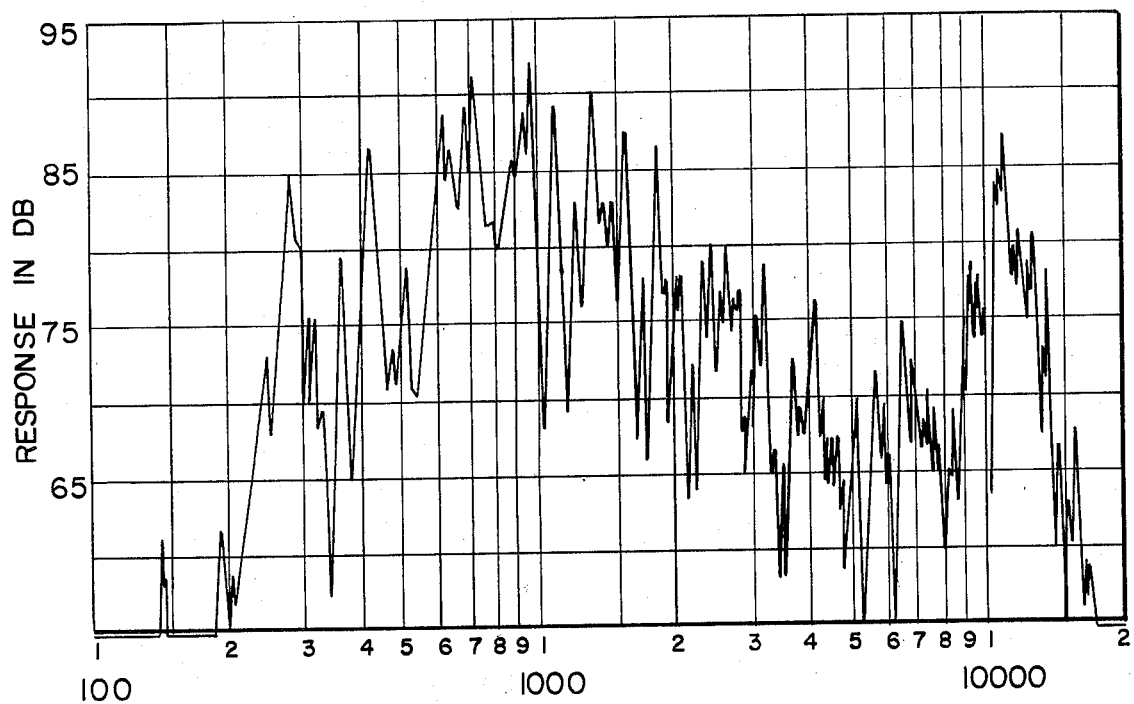
FIG. 12 is a logarithmic plot of the frequency response of a Stradivarius violin circa 1711 electromechanically excited.
Figure 13:
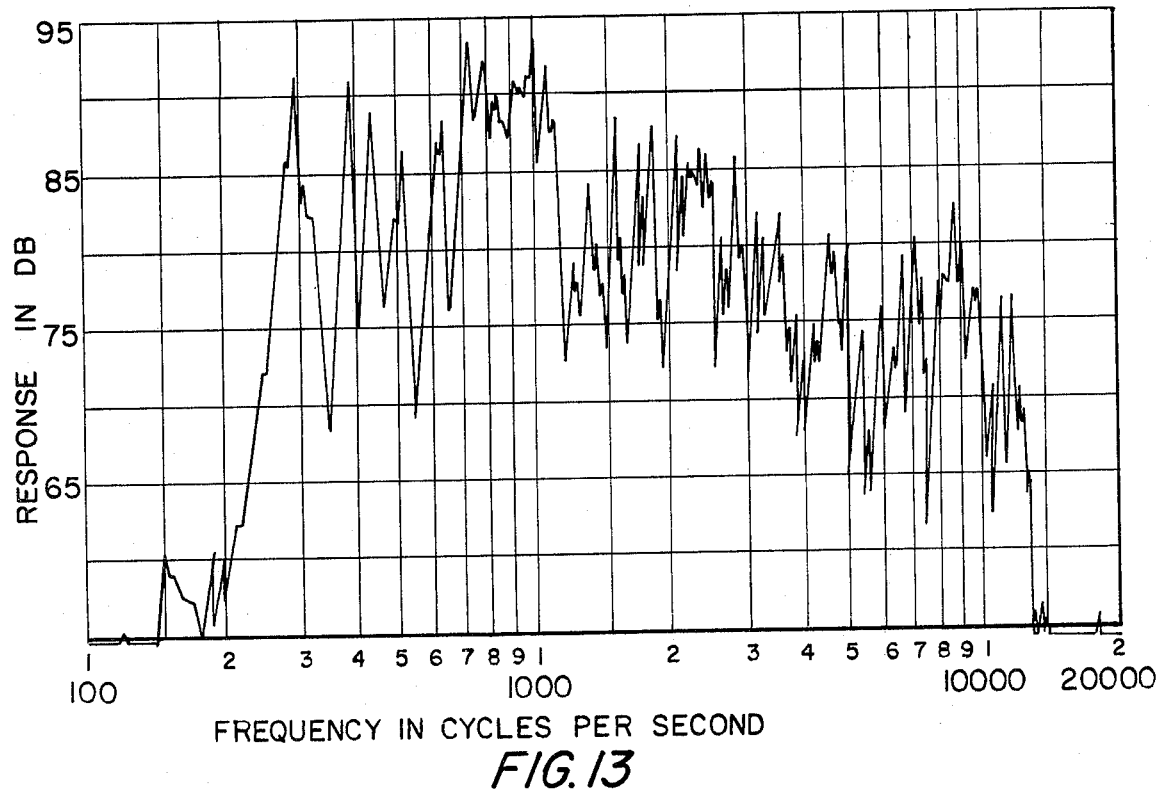
FIG. 13 is a logarithmic plot of the frequency response of a violin having a top plate of the invention electromechanically excited.

One of the most striking facts illustrating the high quality of the inventive material for manufacture of stringed instruments is shown in FIGS. 13 and 12 which shows the respectively frequency response obtained from a violin having a top plate manufactured from the inventive material prepared in accordance with the method of Example 1 and the frequency response of a Stradivarius violin circa 1711. One may readily appreciate the identity of the respective responses from a comparison of the plots of the responses.

In FIG. 14 a comparison of the loudness of a precisely tuned wood violin and a violin having a top plate of the inventive material prepared in accordance with the method of Example 1 is shown. It can be observed that the strong resonance peaks of each instrument are optimally and similarly placed.

EXAMPLE 2

A core material comprised of glass microballoons embedded in uncured epoxy resin was placed between outer layers of graphite fiber epoxy material layers which had been individually cured and bonded according to the method of curing the composite of Example 1. The core material was placed between layers of fiber material and the composite finally cured at room temperature thereby bonding the core to the previously bonded outer layers. The finished core material was 0.15 cm thick having a density of 0.7 g/cc. Flat strips of the material having a composite thickness of 0.18 cm were cut. By means of electromagnetic excitation, the free strips were vibrated at their fundamental modes of flexural vibration and the bending stiffness ratio of the material was determined to be 16.1.

EXAMPLE 3

A core material of rubber impregnated foamed polypropylene was fastened with contact cement to outer bonded layers of graphite fiber epoxy material previously cured according to the method of curing the composite of Example 1. The core material was 0.09 cm thick having a density of 0.07 g/cc. Flat strips of the material having a composite thickness of 0.125 cm were cut. By means of electromagnetic excitation, the free strips were vibrated at and near their fundamental modes of flexural vibration and the bending stiffness ratio was determined to be 9:1 and the along grain logarithmic decrement was found to be 0.11 at 513 $H_z$. If this point were to be plotted onto the graph illustrated in FIG. 3, it would be appreciated that the decrement far exceeds the ranges of satisfactory values. This poor result is attributable to the use of a core material outside of the range of densities to satisfy the requirements of the inventive material.

EXAMPLE 4

A material was prepared in accordance with Example 1 except that graphite fibers of lower Young's modulus were employed. Strip tests as described in the previous examples enabled the expected lower bending stiffness ratio of 9:1 to be determined.

If for any reason it is desired to increase the "cross-grain" stiffness of the construction material, a fabric, e.g. scrim cloth may be interposed between layers of the material and bonded therein. It will be appreciated that graphite fibers of higher or lower stiffness may also be used within the scope of the invention without destroying any of the desired properties of the inventive material, in fact, it is necessary to use fibers of different stiffnesses if it is desired to simulate the properties of a particular wood. It will also be recognized that the construction material of the invention can be manufactured in various thicknesses and non-uniformly in accordance with the desired use, e.g. piano sound boards and guitar plates, without interfering with the tonal radiation sought. Various resins, e.g. polyurethane, polystyrene, may also be substituted for the epoxy resin of the illustrative examples without departing from the scope of the invention. For aesthetic purposes thin veneers are quite commonly applied to the exposed surfaces of the inventive construction material without any deleterious effects, and it will be appreciated that soundholes, bass bars, braces and the like may be cut into or mounted onto the material of the invention in the same manner as done with wood instruments.

I claim:
1. A construction material especially suitable for use in the manufacture of soundboards and panels used in stringed musical instruments comprising a mat of fibers embedded in a resin matrix in which said fibers have a Young's modulus of elasticity greater than $18 \times 10^{11}$ dynes/cm² and a density less than 2 g/cc and are oriented in such manner as to effect a bending stiffness ratio of at least 4:1 in said construction material bonded to a mat of cardboard having a density within the range of 0.15 g/cc and 1 g/cc.

2. A construction material especially suitable for use in the manufacture of soundboards and panels used in stringed musical instruments comprising a mat of fibers embedded in a resin matrix in which said fibers have a Young's modulus of elasticity greater than $18 \times 10^{11}$ dynes/cm$^2$ and a density less than 2 g/cc and are oriented in such manner as to effect a bending stiffness ratio of at least 4:1 in said construction material bonded to a mat of glass microspheres embedded in epoxy resin having a density within the range of 0.15 g/cc and 1 g/cc.

3. The construction material of claim 1 wherein the mat of fibers comprises graphite fibers embedded in epoxy resin.

4. The construction material of claim 2 wherein the mat of fibers comprises graphite fibers embedded in epoxy resin.

5. The construction material of claim 3 wherein the mat of cardboard is sandwiched between layers of said mat of graphite fibers.

6. The construction material of claim 4 wherein the mat of glass microspheres embedded in epoxy resin is sandwiched between layers of said mat of graphite fibers.

7. A construction material especially suitable for use in the manufacture of soundboards and panels used in stringed musical instruments comprising a mat of graphite fibers embedded in epoxy resin in which said fibers have a Young's modulus of elasticity greater than $18 \times 10^{11}$ dynes/cm$^2$ and a density less than 2 g/cc and are oriented in such manner as to effect a bending stiffness ratio of at least 4:1 in said construction material bonded to a mat of cardboard having a density within the range of 0.15 g/cc and 1 g/cc, said fibers being oriented unidirectionally.

8. A construction material especially suitable for use in the manufacture of soundboards and panels used in stringed musical instruments comprising a mat of graphite fibers embedded in an epoxy resin in which said fibers have a Young's modulus of elasticity greater than $18 \times 10^{11}$ dynes/cm$^2$ and a density less than 2 g/cc and are oriented in such manner as to effect a bending stiffness ratio of at least 4:1 in said construction material bonded to a mat of glass microspheres embedded in epoxy resin having a density within the range of 0.15 g/cc and 1 g/cc, said fibers being oriented unidirectionally.

9. A construction material especially suitable for use in the manufacture of soundboards and panels used in stringed musical instruments comprising a mat of graphite fibers embedded in epoxy resin in which said fibers have a Young's modulus of elasticity greater than $18 \times 10^{11}$ dynes/cm$^2$ and a density less than 2 g/cc and are oriented in such manner as to effect a bending stiffness ratio of at least 4:1 in said construction material bonded to a mat of cardboard having a density within the range of 0.15 g/cc and 1 g/cc, said fibers being oriented unidirectionally, said mat of cardboard being sandwiched between layers of said mat of graphite fibers.

10. A construction material especially suitable for use in the manufacture of soundboards and panels used in stringed musical instruments comprising a mat of graphite fibers embedded in an epoxy resin in which said fibers have a Young's modulus of elasticity greater than $18 \times 10^{11}$ dynes/cm$^2$ and a density less than 2 g/cc and are oriented in such manner as to effect a bending stiffness ratio of at least 4:1 in said construction material bonded to a mat of glass microspheres embedded in epoxy resin having a density within the range of 0.15 g/cc and 1 g/cc, said fibers being oriented unidirectionally, said mat of glass microspheres being sandwiched between layers of said mat of graphite fibers.

11. A construction material especially suitable for use in the manufacture of soundboards and panels used in stringed musical instruments comprising a mat of graphite fibers embedded in a resin matrix in which said fibers have a Young's modulus of elasticity greater than $18 \times 10^{11}$ dynes/cm$^2$ and a density less than 2 g/cc and are oriented in such manner as to effect a bending stiffness ratio of at least 4:1 in said construction material bonded to a mat of cardboard having a density within the range of 0.15 g/cc and 1 g/cc.

12. A construction material especially suitable for use in the manufacture of soundboards and panels used in stringed musical instruments comprising a mat of boron or graphite fibers embedded in a resin matrix in which said fibers have a Young's modulus of elasticity greater than $18 \times 10^{11}$ dynes/cm$^2$ and a density less than 2 g/cc and are oriented in such manner as to effect a bending stiffness ratio of at least 4:1 in said construction material bonded to a mat of cardboard or glass microbaloons embedded in an epoxy resin having a density within the range of 0.15 g/cc and 1 g/cc.

* * * * *